US012427534B2

(12) United States Patent

Pagan Valverde et al.

(10) Patent No.: US 12,427,534 B2
(45) Date of Patent: Sep. 30, 2025

(54) MULTI-COMPARTMENT SPRAYER

(71) Applicants: David Pagan Valverde, Santa Eulalia de Ronçana (ES); José Navarro Valverde, Castellar del Vallés (ES)

(72) Inventors: David Pagan Valverde, Santa Eulalia de Ronçana (ES); José Navarro Valverde, Castellar del Vallés (ES)

( * ) Notice: Subject to any disclaimer, the term of this patent is extended or adjusted under 35 U.S.C. 154(b) by 421 days.

(21) Appl. No.: 17/992,178

(22) Filed: Nov. 22, 2022

(65) Prior Publication Data

US 2023/0158530 A1 May 25, 2023

(30) Foreign Application Priority Data

Nov. 24, 2021 (ES) ................................ ES202131094

(51) Int. Cl.
*B05B 11/10* (2023.01)

(52) U.S. Cl.
CPC ...... *B05B 11/1081* (2023.01); *B05B 11/1057* (2023.01)

(58) Field of Classification Search
CPC ........................ B05B 11/1081; B05B 11/1057
USPC ...................... 239/305, 442, 447, 526, 581.1
See application file for complete search history.

(56) References Cited

U.S. PATENT DOCUMENTS

| | | | |
|---|---|---|---|
| 912,106 | A | 2/1909 | Frazier |
| 3,298,611 | A | 1/1967 | Marraffino et al. |
| 2010/0282776 | A1 | 11/2010 | Knopow et al. |
| 2020/0078799 | A1 | 3/2020 | Corona et al. |

FOREIGN PATENT DOCUMENTS

| | | | |
|---|---|---|---|
| BE | 546389 | | 4/1956 |
| EP | 0650767 | A1 | 5/1995 |
| IT | BO20120211 | A1 | 10/2013 |

*Primary Examiner* — Christopher S Kim
(74) *Attorney, Agent, or Firm* — TheWebb Law Firm

(57) ABSTRACT

A multi-compartment sprayer with a main body and an outer casing and which houses a plurality of conduits intended for containing fluids to be sprayed independently. It includes movable equipment having a rotary movement assembly which rotates about a guide shaft of the sprayer and allows selecting the product to be sprayed and has an unlocking movement assembly configured to move axially in the direction of the guide shaft. Likewise, the sprayer includes fixed equipment with a fixed casing inside which the movement assemblies are arranged and with an actuating trigger and a locking button to allow/prevent the change of nozzles for product selection.

17 Claims, 12 Drawing Sheets

MULTI-COMPARTMENT SPRAYER

CROSS-REFERENCE TO RELATED APPLICATION

This application claims priority to Spanish Patent Application No. P202131094 filed Nov. 24, 2021, the disclosure of which is hereby incorporated by reference in its entirety.

BACKGROUND OF THE DISCLOSURE

Field of the Disclosure

The present disclosure is related to the sector of spraying products devices with multiple containers. The proposed sprayer is configured for dispensing products, preferably fluids, independently housed in said containers.

Description of Related Art

Different multi-compartment spray devices such as, for example, the one described in document U.S. Pat. No. 3,298,611 which allows fluids that are housed in different compartments to be mixed during spraying, are known from the state of the art.

Document U.S. Pat. No. 912,106 which describes another type of multi-compartment sprayer that allows independently spraying each of the fluids in the different compartments is also known.

Lastly, document US20100282776 proposes a device for selectively dispensing several fluids that are stored separately from one another such that the final use product is mixed on demand during dispensing.

SUMMARY OF THE DISCLOSURE

The disclosure relates to a multi-compartment sprayer. The key to said sprayer is that it comprises a rotary movement assembly that allows the user to conveniently select a product to be sprayed from among the plurality of products contained in the sprayer.

The sprayer comprises an outer casing in which the containers for the products are located and in which movable equipment and fixed equipment are provided, wherein the movable equipment includes the rotary movement assembly and an unlocking movement assembly in charge of allowing or blocking the product selection rotary movement.

The rotary movement assembly comprises a plurality of nozzles, configured for spraying the products from the conduits; a distributor drum which connects the conduits with the corresponding nozzles and allows passage therethrough only in the position selected by the user; a drum cover which is attached to the distributor drum to fix the position of the components that may be arranged therein such as, for example, nozzles; and a product selection wheel which is the element actuated by the user to select the product to be sprayed.

The fixed equipment of the sprayer comprises a fixed casing with a fixed casing cover and the guide shaft about which the rotary movement assembly rotates and along which the unlocking movement assembly moves to allow or prevent the movement of the rotary movement assembly. The fixed equipment also includes a trigger to actuate the sprayer, that is, the trigger, when actuated, presses the nozzles thus producing a linear movement therein and forcing the product to be sprayed through the nozzles.

In a preferred embodiment, the product selection wheel is concealed in the outer casing of the sprayer. When the product is to be changed, the movable body is unlocked and emerges on the rear part of the outer casing to enable the selection of the product. Only the nozzle positioned in the lower part of the drum can be actuated. The spray nozzle protrudes through the front part of the trigger. Unobstructed spraying is thereby ensured. In addition, the trigger has a housing which coincides with the support for actuating the spray nozzle.

In the spray position, the nozzle goes through the trigger, therefore, in order to be able to change the product, it will be necessary to move the movable equipment backwards, releasing the drum and facilitating the rotary movement. To select the product to be sprayed, the drum rotates, integral with the product selection wheel, until the desired product is available.

To spray the product, it is necessary that the movable body is fixed, such that it allows the plunger of the corresponding metering system to travel and to return by means of a spring. That is, in a preferred embodiment, the metering system is embodied as a piston, which is coupled with the nozzles. The piston functions as a bomb, which comprises a chamber containing the product to be sprayed, and a plunger which presses the product to be sprayed when actuated.

The assembly is locked/released by means of the locking button located in the rear part of the sprayer. The movable body has a groove in the lower rear part in which the locking button fits when locking is to be performed. Moving the button downwards releases the movable body, which emerges as a result of the action of the wheel output spring.

Once the wheel is visible, the product can be selected. To that end, simply turning the wheel in any direction will suffice. Once the product has been chosen, there is a need to press the rear part of the wheel until the movable body is completely concealed. The locking system will automatically fix the body as a result of a spring comprised in the locking button and exerting a restoring force that directs it towards the inside of the groove in the movable casing.

BRIEF DESCRIPTION OF THE DRAWINGS

To complete the description, and for the purpose of helping to make the features of the disclosure more readily understandable, this description is accompanied by a set of drawings constituting an integral part of the same, which by way of illustration and not limitation represents the following:

In FIG. 10A a complete section has been made, whereas in FIG. 10B only the outer casing of the main body has been sectioned.

Figure 1A:
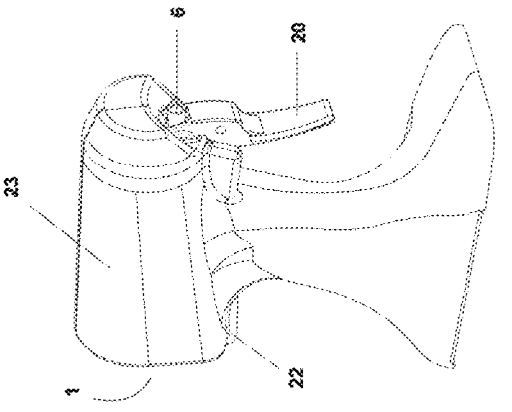
FIGS. 1A-B depict perspective views of the sprayer from different angles.

Below, a list is provided of the different elements represented in the figures making up the disclosure:

1. Sprayer
2. Movable equipment
3. Rotary movement assembly
4. Unlocking movement assembly
5. Combinable part
6. Nozzle
7. Metering system
8. Drum
9. Cavity
10. Drum cover
11. Product distributor
12. Feeding conduit
13. Product selection wheel
14. Movable casing
15. Connection to feeding tube
16. Fixed equipment
17. Fixed casing
18. Fixed housing cover
19. Guide shaft
20. Trigger
21. Wheel output spring
22. Locking button
23. Outer casing
24. Stop
25. Outlet
26. Key
27. First opening
28. Label
29. Second opening
30. Central shaft
31. Through hole
32. Hollow projection
33. First receptacle
34. Second receptacle
35. Protrusion
36. Locking groove
37. Passage groove
38. Distributor drum
39. Actuating part
40. Fixing part C. Compartment

DETAILED DESCRIPTION

The present disclosure should not be limited to the embodiment described herein. Other configurations may be carried out by those skilled in the art based on the present description. Accordingly, the scope of the disclosure is defined by the following claims.

Figure 1B:
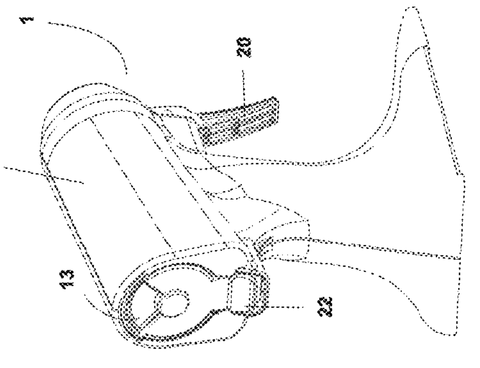
Figure 4C:
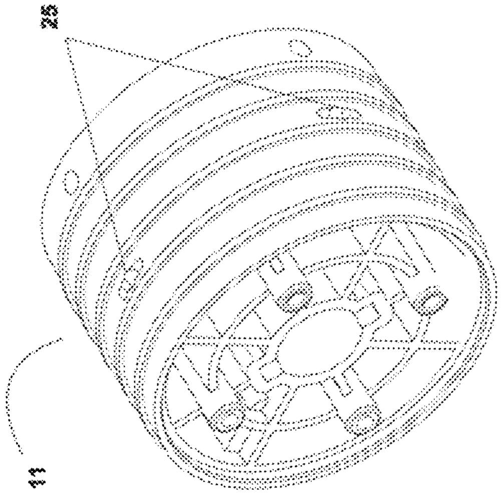
Figure 4B:
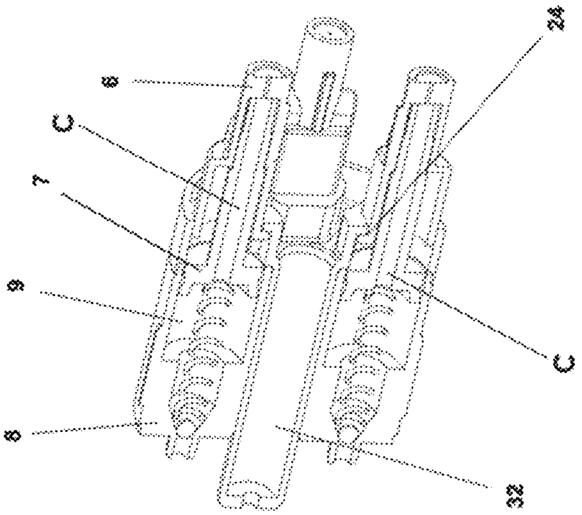
Figure 5A:
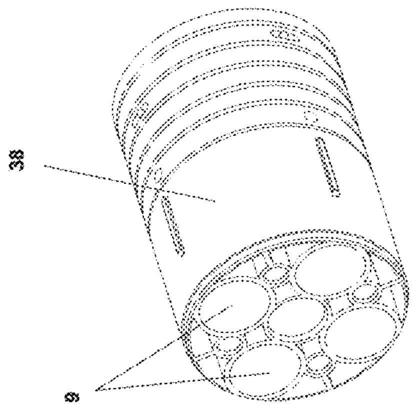
FIGS. 5A-B respectively depict views of the distributor drum in an embodiment in which it is a single body and of the distributor drum when it comprises a plurality of combinable parts, respectively.

FIGS. 1A-B depict the multi-compartment (C) sprayer (1) of the disclosure in perspective views from different angles. As can be seen, the sprayer (1) comprises a main body with an outer casing (23) which covers and protects movable equipment (2), fixed equipment (16), and a plurality of compartments (C), shown in FIG. 4B, in which products to be sprayed, generally fluids, are housed.

Figure 2A:
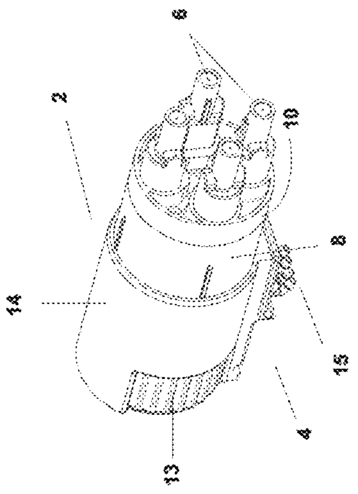
FIGS. 2A-B respectively depict a perspective view of the assembled movable equipment and an exploded view of said movable equipment.
Figure 2B:
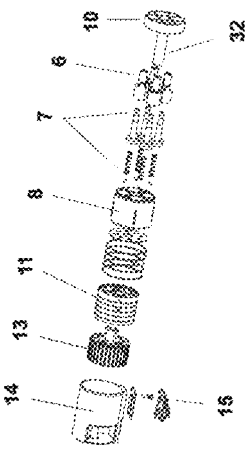
Figure 4A:
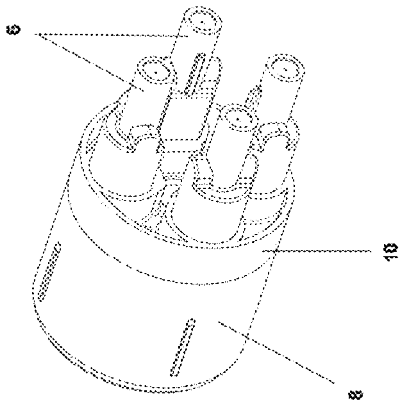
FIGS. 4A-D respectively depict a figure of the assembly of nozzles, drum, and drum cover in a perspective view and a figure of said assembly in a sectional view, and a figure of the product distributor in a perspective view and a figure of said product distributor in a sectional view.

FIGS. 2A-B show the movable equipment (2). Said movable equipment in turn comprises a rotary movement assembly (3) that can be seen in FIG. 3 and the elements of which have also been depicted in FIGS. 4A-D, 5A-B, and 6, and comprises an unlocking movement assembly (4) the elements of which have been depicted in FIGS. 7A-B and 8A-B.

Figure 3:
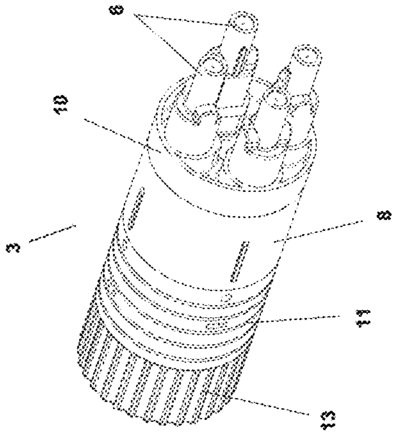
FIG. 3 shows a perspective view of the rotary movement assembly.

The rotary movement assembly (3) of FIG. 3 is configured for rotating about a guide shaft (19) of the sprayer (1). This movement allows selecting the product to be sprayed, that is, selecting from which compartment spraying is to be performed.

The rotary movement assembly (3) comprises a plurality of nozzles (6), connected to corresponding metering systems (7) housed in cavities (9) of a distributor drum (38), and comprises a drum cover (10) which, in an embodiment like the one shown in the figures, has a plurality of holes through which the nozzles (6) pass. Likewise, the nozzles (6) preferably comprise stops (24) to ensure their position between the distributor drum (38) and the drum cover (10). Preferably these stops (24) and the cavities (9) have a flat face such that the rotation of the piston of the metering system (7) is prevented and the correct position of the nozzle (6) with respect to the spraying trigger (20) which will be described below is maintained at all times.

The diameter of the nozzle (6) is slightly smaller than the diameter of the piston of the corresponding metering system (7), just enough so that the plunger of the piston can move freely. The plunger is therefore fully guided. This sizing prevents unwanted play in the plunger, thereby lengthening the service life of the components.

The drum cover (10) can also have a shaft-like hollow projection (32) configured to go through a hole of the distributor drum (38) until it is housed inside a first receptacle (33). The distributor drum (38) also comprises a plurality of feeding conduits (12) therein, each of them being configured for being connected to a cavity (9) and a radial outlet (25) through which they are connected to a feeding tube connection (15) through which the fluid contained in the corresponding compartment is dispensed. In an embodiment such as the one shown in the figures, the feeding conduits (12) have an L-shaped configuration, wherein the longest section depends on the position of the corresponding feeding tube connection (15) and the shortest section of the conduit is alike in all the feeding conduits (12).

Figure 4D:
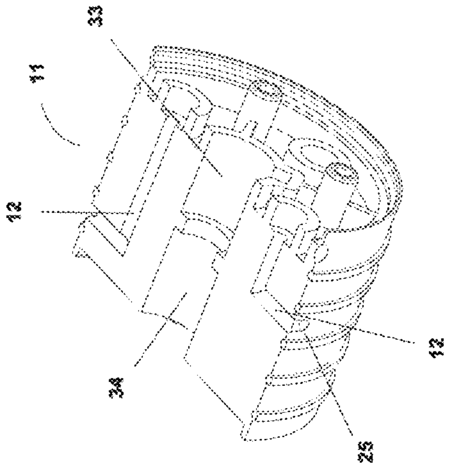

In one embodiment, the distributor drum (38) comprises a drum (8) and a product distributor (11) attached to one another. An example of a product distributor (11) has been depicted in FIG. 4C. The product distributor (11) is attached (preferably by means of an integral attachment) to the drum (8) and drum cover (10) assembly. FIG. 4D shows a sectional view of a product distributor (11). The feeding conduits (12) are also arranged inside the distributor drum (38) when the drum is a single body such as in the example shown in FIG. 5A.

When the distributor drum (38) comprises a drum (8) and a distributor (11), the attachment between the distributor (11) and the drum (8) and drum cover (10) assembly is made by means of housing the hollow projection (32) of the drum cover (10) in a first receptacle (33) of the distributor (11). This first receptacle (33) is arranged in the center of the distributor (11) and in correspondence therewith there is a second receptacle (34), which projects in the opposite direction and is intended for receiving a protrusion (35) of a product selection wheel (13) (in which a key (26) is arranged). The inside of the protrusion (35) of the product selection wheel is hollow to allow the passage of a central shaft (30) of a movable casing (14) as will be described below.

Likewise, the distributor (11) or the distributor drum (38) preferably comprise sealing gaskets between different feeding bands, that is, between sections of the distributor (11) in which the outlets (25) of the feeding conduits (12) are located which, in a possible embodiment, are arranged radially. There may also be a sealing gasket between the drum (8) and the distributor (11).

Figure 5B:
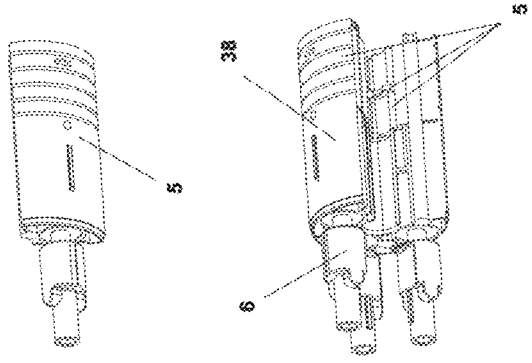

FIG. 5B depicts another possible embodiment of the distributor drum (38) in which it comprises a plurality of combinable parts (5), wherein each of them comprises a cavity (9) and the corresponding feeding conduit (12). The combinable parts (5) are attached to one another, to the drum cover (10), and to the product selection wheel (13) and are housed in the fixed casing (17).

Figure 6:
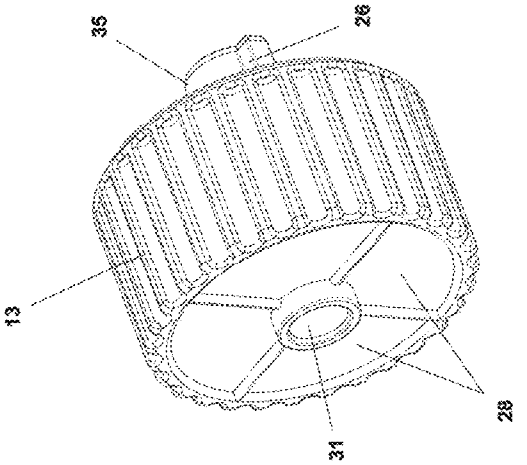
FIG. 6 depicts a perspective view of the product selection wheel.

FIG. 6 shows the product selection wheel (13) of the rotary movement assembly (3). When it is assembled in the sprayer, it is linked to the distributor drum (38) by means of the protrusion (35) which is housed in the second receptacle (34) of the distributor drum (38). Therefore, upon actuating the rotation of said product selection wheel (13), the entire rotary movable assembly (3) is caused to rotate.

Figure 9:
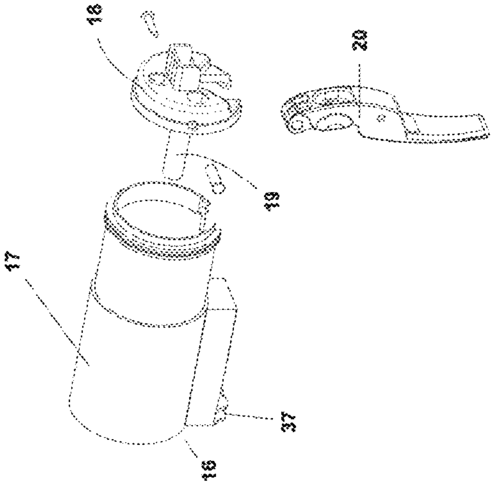
FIG. 9 shows an exploded view of the fixed equipment.

In a preferred embodiment, the unlocking movement assembly (4), shown in an exploded view in FIG. 9, is configured to move axially in the direction of the guide shaft (19) of the sprayer (1) and allows movement of part of the movable equipment (2) out of the outer casing (23), such that the product selection wheel (13) is accessible to the user.

Figure 7B:
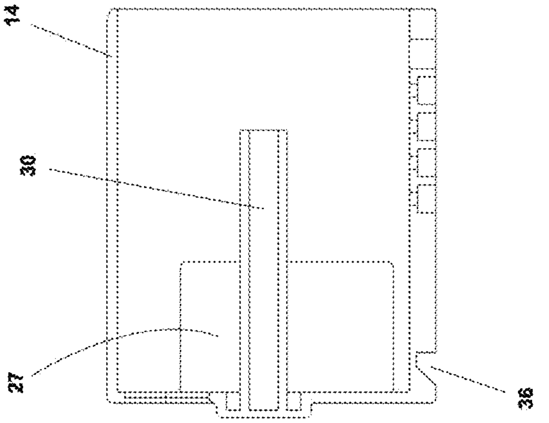
FIGS. 7A-B respectively depict the movable casing in a perspective view and a figure of the movable casing in a sectional view.
Figure 7A:
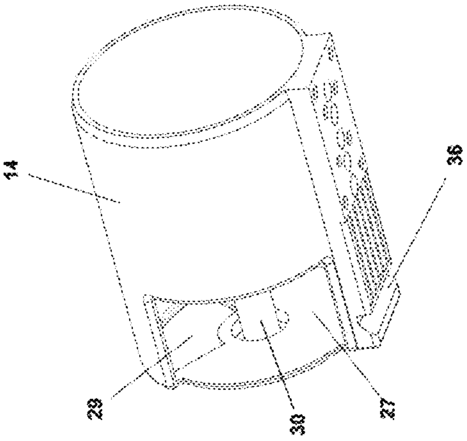

To that end, in a preferred embodiment of the disclosure, the unlocking movement assembly (4) comprises a movable casing (14) inside which the product selection wheel (13) and at least part of the distributor drum (38) are housed and inside which they can rotate. FIGS. 7A-B show perspective and sectional views of the movable casing (14). The movable casing (14) comprises a first lower and/or side opening (27) that allows the user to access the product selection wheel (13).

In one embodiment, the wheel (13) may comprise, on its rear face, identification labels (28) for identifying the type of product in each compartment in order to make it easier for the user to select the desired product. In this case, it can be seen how, in the example of FIGS. 7A-B, the movable casing (14) comprises a window-like second opening (29) which shows the product identification label (28).

As can be seen in FIG. 7B, the movable casing (14) also comprises a central shaft (30) which is intended for being housed inside a through hole (31) of the wheel (13) such that the wheel (13) can rotate about said central shaft (30) but is restricted from moving in the radial direction. The restriction of the movement of the wheel (13) in the axial direction with respect to the central shaft (30) is achieved by means of the integral attachment with the distributor drum (38) when the entire movable equipment (2) is assembled.

Likewise, the movable casing (14) has a locking groove (36), preferably in its lower area, intended for receiving a projection of a locking button (22) which allows or prevents the axial movement of said movable casing (14) as will be described below.

Figure 8B:
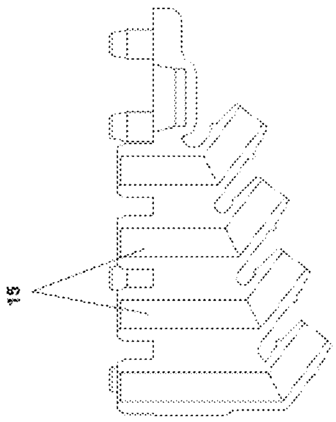
FIGS. 8A-B respectively depict the feeding tube connector in perspective and section views.
Figure 8A:
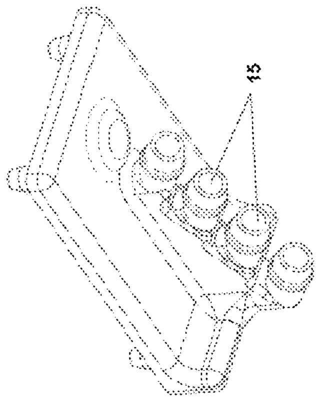

FIGS. 8A-B depict the feeding tube connections (15) which are configured for attaching the compartments with the outlets (25) of the corresponding feeding conduits (12).

Fixed equipment (16) comprising a fixed casing (17) with a fixed casing cover (18) and the guide shaft (19) about which the movement assembly (3) rotates and along which the unlocking movement assembly (4) moves is also part of the sprayer (1) of the disclosure. Likewise, the fixed equipment (16) comprises a trigger (20) with which the sprayer is actuated. The fixed equipment (16) may also comprise a wheel output spring (21) and a locking button (22). These elements of the fixed equipment (16) can be seen in FIG. 9.

Preferably, it is possible for the trigger (20) to perform a pivoting movement about a pin whereby it is linked to the fixed casing cover (18). The wheel output spring (21) is arranged, in one embodiment, between the guide shaft (19) and the hollow projection (32) of the drum cover (10), housed in said hollow projection (32).

As seen above, the fixed equipment (16) preferably comprises a locking button (22) that is configured for blocking the axial movement of the unlocking movement assembly (4) with respect to the fixed body (16) when it is partially housed in the locking groove of the movable casing (14).

In one embodiment, the fixed casing (17) also comprises a passage groove (37) for the section of the locking button (22) which is housed, in the locking position, in the locking groove (36) of the movable casing (14).

In the embodiments shown in the figures, the locking button (22) comprises an actuating part (39) which is the one that is actuated by the user, and a second fixing part (40), attached to the actuating part (39) and which is the one that is housed in the locking groove (36). Preferably, as seen for example in FIG. 11B, the fixing part (4) is assembled on a spring.

Figure 10A:
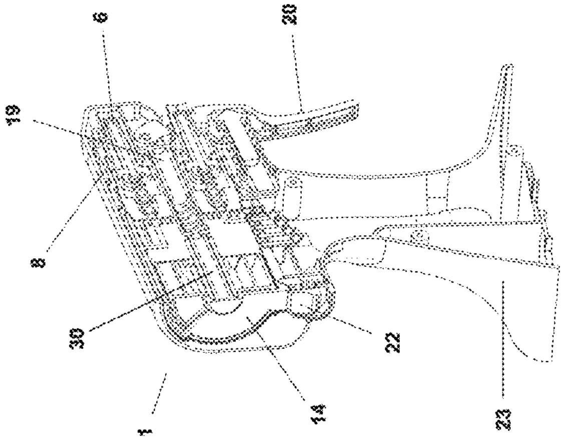
FIGS. 10A-B depict sectional views of the sprayer.
Figure 10B:
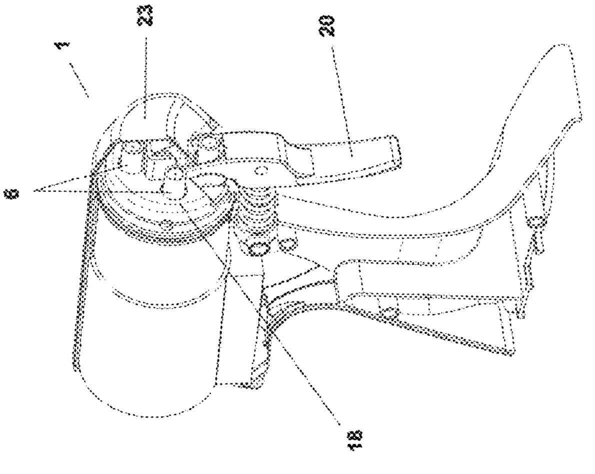

FIG. 10A depicts a sectional view of the sprayer (1) with the movable equipment (2) and the fixed equipment (16) assembled. All the elements of the rotary movement assembly (3) and the unlocking movement assembly (4) can also be seen. FIG. 10B depicts a similar view, but in this case the outer casing (23) of the sprayer (1) is shown in a sectional view, whereas the movable equipment (2) and the fixed equipment (16) are depicted as a whole, without being sectioned.

Figure 11A:
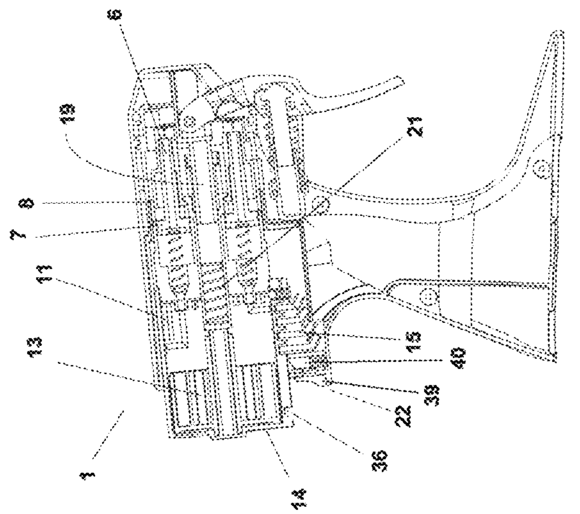
FIGS. 11A-B depict sectional views of the sprayer in the unlocked position and in the locked position, respectively.

FIG. 11A depicts a sectional view of the sprayer (1) in an unlocked position. As can be seen, in this case the locking button (22) is completely outside the locking groove (36) of the movable casing (14) and this has been partially moved towards the outside of the fixed casing (17) and of the outer casing (23). More specifically, the fixing part (40) of the locking button (22) is in the lowest possible position, outside the locking groove (36).

In this way, the first opening (27) remains outside the outer casing (23), allowing the user to access the product selection wheel (13) in order to be able to turn it until selecting the desired product for spraying.

When the locking groove (36) is released, the wheel output spring (21) exerts a restoring force which is responsible for forcing the axial movement of the unlocking movement assembly (4).

Figure 11B:
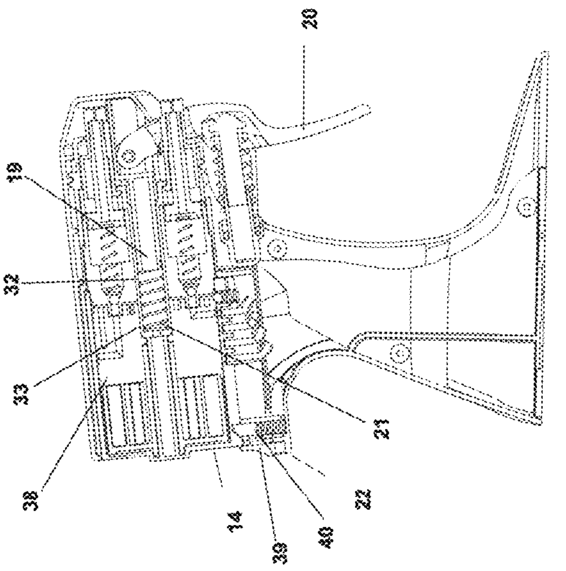

When the user has selected the desired product, he/she pushes the entire movable equipment (2) towards the inside of the outer casing (23) of the sprayer (1) until the locking button (22) is partially housed in the locking groove (36). As can be seen in the figures and as described above, the locking button (22) preferably comprises springs that exert a thrust force which forces the movement of the fixing part (40) towards the locking groove (36). The locking position is shown in FIG. 11B.

Figure 12:
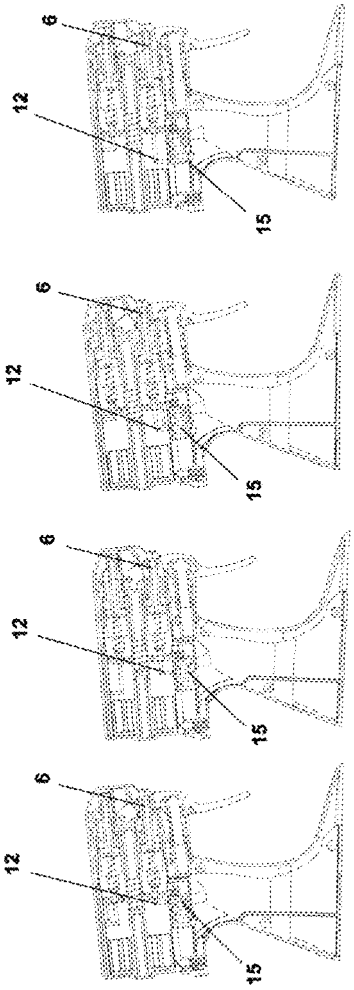
FIG. 12 depicts sectional views of the sprayer, which in this case comprises four compartments, in the four possible positions, and the connection of one of the compartments with a nozzle through the connector and corresponding feeding conduit is observed in each of them.

FIG. 12 depicts the different possible locking positions corresponding to the different product selection options. In the example depicted in this case, there are four different positions and each one corresponds to the selection of a corresponding compartment, feeding conduit (12), metering system (7), conduit (9), and nozzle (6).

To provide the sprayer (1) with greater safety during product selection operations, it comprises a plurality of safety elements which prevent the components from breaking and guarantee proper positioning of the spray nozzles (6).

The sprayer (1) may comprise a plurality of alignment grooves both in the movable equipment (2) and in the fixed equipment (16) such that the unlocking movement assembly (4) (after having selected the product) is always positioned correctly inside the fixed casing (17) when being pushed.

It can also comprise a spherical seat which allows a step-by-step product change to be performed as a result of the distributor drum (38) comprising a plurality of spherical seats (preferably "n" spherical seats, wherein "n" is the number of compartments) that are radially aligned in an equidistant manner. To that end, the device comprises, in the feeding tube connections (15), a spring with a metal sphere acting such that, when turning the product selection wheel (13), the spring yields and the metal sphere fits into the seat, guaranteeing the correct position of the assembly for the selected product.

The fixed equipment (16) also has two end-of-travel limits which guarantee the correct position of the rotary movement assembly (3) both when it is locked to perform spraying and when it has been unlocked to allow product selection.

Additionally, to lengthen the service life of the metering systems (7), and more specifically of the pistons of said metering systems (7), the sprayer (1) may comprise a reinforcement spring linked to the trigger (20), the purpose of which is to facilitate the return of the trigger (20) when it is actuated by a user. If not present, all the return force of the trigger (20) would fall directly on the spring of the piston of the corresponding metering system (7).

The invention claimed is:

1. A multi-compartment sprayer comprising:
- a main body, wherein the main body comprises:
  - an outer casing;
  - a plurality of compartments intended for containing products to be sprayed; and
  - movable equipment wherein the movable equipment comprises:
    - a rotary movement assembly configured for rotating about a guide shaft of the sprayer, wherein the rotary movement assembly comprises:
      - a plurality of nozzles configured for spraying the products in the compartments;
      - a distributor drum with cavities and outlets, further comprising metering systems in the cavities in correspondence with the nozzles, the distributor drum further comprising a plurality of feeding conduits therein wherein each of the feeding conduits is connected to one of the cavities and to an outlet through which the feeding conduits are connected to a feeding tube connection through which a fluid contained in a corresponding compartment of the plurality of compartments is dispensed;
      - a drum cover configured for being attached to the distributor drum;
      - a product selection wheel linked to the distributor drum such that, by actuating the rotation of the product selection wheel, the rotary movement assembly is caused to rotate; and
      - an unlocking movement assembly configured for allowing or preventing the rotary movement of the rotary movement assembly; and
  - fixed equipment comprising:
    - a fixed casing with a fixed casing cover and the guide shaft about which the rotary movement assembly rotates and along which the unlocking movement assembly moves; and
    - a trigger.

2. The multi-compartment sprayer of claim 1, wherein the distributor drum comprises a drum and a product distributor, wherein the cavities are located in the drum, wherein the outlets and the feeding conduits are located in the product distributor, and wherein the drum and product distributor are attached to one another.

3. The multi-compartment sprayer of claim 1, wherein the distributor drum comprises a plurality of combinable parts wherein a cavity and a corresponding feeding conduit are located in each combinable part, and wherein the the combinable parts remain attached to one another and to the drum cover and to the product selection wheel and are housed in the fixed casing of the fixed equipment.

4. The multi-compartment sprayer of claim 1, wherein the unlocking movement assembly comprises:
- a movable casing inside which the product selection wheel and the product dispenser are housed and inside which they can rotate, and the movable casing comprises a locking groove; and
- the feeding pipe connections connecting each compartment with the corresponding feeding conduit.

5. The multi-compartment sprayer of claim 4, comprising a locking button configured for blocking the axial movement of the unlocking movement assembly with respect to the fixed body when it is partially housed in the locking groove of the movable casing.

6. The multi-compartment sprayer of claim 1, in which the fixed equipment further comprises an output wheel spring arranged between the guide shaft and the hollow projection of the drum cover, housed in the hollow projection.

7. The multi-compartment sprayer of claim 5, wherein the fixed casing comprises a passage groove for the section of the locking button which is housed, in the locking position, in the locking groove of the movable casing.

8. The multi-compartment sprayer of claim 5, wherein the locking button comprises springs that exert a thrust force which forces its movement towards the locking groove.

9. The multi-compartment sprayer of claim 4, wherein the movable casing comprises a first lower and/or side opening that allows the user to access the product selection wheel.

10. The multi-compartment sprayer of claim 9, wherein the movable casing comprises a second opening which coincides with the position of at least one product identification label arranged on a rear face of the product selection wheel.

11. The multi-compartment sprayer of claim 4, wherein the movable casing comprises a central shaft which is intended for being housed inside a through hole of the wheel such that the wheel can rotate about the central shaft with a restricted radial movement, and wherein the restriction of the axial movement of the wheel in the central shaft of the movable casing is restricted by means of an integral attachment with the distributor drum when the entire movable equipment is assembled.

12. The multi-compartment sprayer of claim 1, wherein trigger has pivoting movement about a pin whereby it is linked to the cover of the fixed casing.

13. The multi-compartment sprayer of claim 1, wherein the feeding conduits have an L-shaped configuration, wherein the longest section depends on the position of a feeding tube connection through which the fluid contained in the corresponding compartment is dispensed.

14. The multi-compartment sprayer of claim 13, wherein the shortest section of the L-shaped feeding conduits is alike in all the feeding conduits.

15. The multi-compartment sprayer of claim 1, comprising a plurality of alignment grooves, both in the movable equipment and in the fixed equipment, configured to ensure the correct positioning of the unlocking movement assembly inside the fixed casing.

16. The multi-compartment sprayer of claim 1, wherein the distributor drum comprises a plurality of radially aligned spherical seats, and comprises springs with a metal sphere in the feeding tube connections acting such that, when turning the product selection wheel, the spring yields and the metal sphere fits into the spherical seat of the corresponding distributor drum.

17. The multi-compartment sprayer of claim 1, comprising a reinforcement spring linked to the trigger configured to facilitate the return movement of the trigger when it is actuated by a user.

* * * * *